United States Patent [19]

Mennemann et al.

[11] Patent Number: 4,472,511
[45] Date of Patent: Sep. 18, 1984

[54] HIGHLY REFRACTIVE, THO$_2$-FREE OPTICAL GLASSES HAVING REFRACTIVE INDICES OF 1.86–1.94 AND ABBE-INDEX NUMBERS GREATER THAN OR EQUAL TO 30

[75] Inventors: Karl Mennemann, Taunusstein; Danuta Grabowski, Wiesbaden, both of Fed. Rep. of Germany

[73] Assignee: Schott Glaswerke, Mainz, Fed. Rep. of Germany

[21] Appl. No.: 421,710

[22] Filed: Sep. 22, 1982

[30] Foreign Application Priority Data

Sep. 25, 1981 [DE] Fed. Rep. of Germany ....... 3138137

[51] Int. Cl.$^3$ .......................... C03C 3/14; C03C 3/30
[52] U.S. Cl. ...................... 501/78; 501/75; 501/76; 501/901
[58] Field of Search ....... 501/75, 76, 78, 901

[56] References Cited

U.S. PATENT DOCUMENTS

| 3,080,240 | 3/1963 | Geffcken et al. | 501/78 |
| 3,650,780 | 3/1972 | Connelly | 501/78 |
| 3,958,999 | 5/1976 | Izumitani | 501/78 |
| 4,120,732 | 10/1978 | Komorita et al. | 501/78 |
| 4,166,746 | 9/1979 | Ishibashi et al. | 501/901 |

FOREIGN PATENT DOCUMENTS

| 2257635 | 6/1973 | Fed. Rep. of Germany . |
| 49-21408 | 2/1974 | Japan . |

*Primary Examiner*—Mark Bell
*Attorney, Agent, or Firm*—Millen & White

[57] ABSTRACT

Highly refractive, ThO$_2$-free optical glasses having refractive indices of 1.86–1.94 and Abbe-index numbers greater than or equal to 30, comprise:

| | |
|---|---|
| $B_2O_3$ | 17–24 |
| $SiO_2$ | 0.5–6 |
| $B_2O_3$ + $SiO_2$ | 19–27 |
| $La_2O_3$ | 40.1–51 |
| $ZrO_2$ | 5–9 |
| $Nb_2O_5$ | 0.5–25 |
| $Ta_2O_5$ | 0–27 |
| $Nb_2O_5$ + $Ta_2O_5$ | 14–27 |
| $TiO_2$ | 0–8 |
| PbO | 0–12 |
| ZnO | 0–4 |
| $Al_2O_3$ | 0–2 |

6 Claims, No Drawings

HIGHLY REFRACTIVE, THO₂-FREE OPTICAL GLASSES HAVING REFRACTIVE INDICES OF 1.86–1.94 AND ABBE-INDEX NUMBERS GREATER THAN OR EQUAL TO 30

BACKGROUND OF THE INVENTION

The present invention relates to glasses within the system $B_2O_3$—$SiO_2$—$La_2O_3$—$ZrO_2$—$Nb_2O_5$ and/or $Ta_2O_5$, of refractive indices of 1.86 to 1.94 and Abbe numbers equal to or greater than 30.

Glasses which in the widest possible sense may potentially be composed similarly to the glasses according to this invention are described in Japanese OS No. 7 421 408 and in German OS No. 22 57 635. The glasses of these very broadly drawn applications differ from the present invention in that, within the claimed ranges, either the demanded high refractive indices above 1.86 are unattained (German OS No. 22 57 635) or that ZnO must be present in percentages of more than 5% by weight (JP-OS No. 7 421 408 and German OS No. 22 57 635). Because of the insufficient refractive index-improving effect of ZnO, the latter requirement leads to insufficiently high refractive indices or, necessarily, to a decrease in the vitrifier content of $B_2O_3$ and $SiO_2$ with the consequence of insufficient devitrification stability.

Glasses according to JP-PS No. 7 506 326 must necessarily contain $Gd_2O_3$ in percentages from 2–50 wt. %. They are thus fundamentally distinguished from the glasses according to the present invention. Due to this $Gd_2O_3$ percentage they are more expensive also.

German AS No. 10 70 794 describes glasses having refractive indices up to 1.87; higher refractive indices cannot be obtained according to this disclosure because the $La_2O_3$ content is limited to 40 wt. %. German OS No. 20 20 421 likewise describes high-refraction glasses; however, it fails to disclose the extremely favorable effect of the presence of $SiO_2$ and, secondly, these known glasses require high percentages of BaO designed to render them suitable for the desired application (core glass for fibers). There is no reference to Abbe-values which are of particular importance in optical glasses.

SUMMARY OF THE INVENTION

It is an object of this invention to provide inexpensive optical glasses having the mentioned optical values and lacking the disadvantages of the prior art glasses.

Upon further study of the specification and appended claims, further objects and advantages of this invention will become apparent to those skilled in the art.

These objects have been attained by providing highly refractive, essentially $ThO_2$—free optical glasses within the system $B_2O_3$—$SiO_2$—$La_2O_3$—$ZrO_2$—$Nb_2O_5$ and/or $Ta_2O_5$, having refractive indices of 1.86–1.94 and Abbe numbers greater than or equal to 30, consisting essentially of, in % by weight:

| | |
|---|---|
| $B_2O_3$ | 17–24 |
| $SiO_2$ | 0.5–6 |
| $B_2O_3 + SiO_2$ | 19–27 |
| $La_2O_3$ | 40.1–51 |
| $ZrO_2$ | 5–9 |
| $Nb_2O_5$ | 0.5–25 |
| $Ta_2O_5$ | 0–27 |
| $Nb_2O_5 + Ta_2O_5$ | 14–27 |
| $TiO_2$ | 0–8 |
| PbO | 0–12 |
| ZnO | 0–4 |
| $Al_2O_3$ | 0–2 |

Certain preferred compositions are: essentially $ThO_2$— and $Ta_2O_5$—free optical glasses having refractive indices of 1.87–1.93 and Abbe numbers of 30–35, consisting essentially of:

| | |
|---|---|
| $B_2O_3$ | 17–23 |
| $SiO_2$ | 1.5–4 |
| $B_2O_3 + SiO_2$ | 22–27 |
| $La_2O_3$ | 40.5–49 |
| $ZrO_2$ | 5–8 |
| $Nb_2O_5$ | 14–25 (preferably 15–25) |
| $TiO_2$ | 1–8 (preferably 1–7) |
| PbO | 0–12 |
| ZnO | 0–4 |
| $Al_2O_3$ | 0–2 | essentially $ThO_2$—free optical glasses having refractive indices of 1.86–1.94 and Abbe numbers greater than or equal to 35, consisting essentialy of:

| | |
|---|---|
| $B_2O_3$ | 17–24 |
| $SiO_2$ | 0.5–4 |
| $B_2O_3 + SiO_2$ | 19–24 |
| $La_2O_3$ | 44–51 |
| $ZrO_2$ | 6–9 |
| $La_2O_3 + ZrO_2$ | 52–58 |
| $Nb_2O_5$ | 0.5–15 |
| $Ta_2O_5$ | 6–27 |
| $Nb_2O_5 + Ta_2O_5$ | 14–27 |
| $TiO_2$ | 0–3 |
| ZnO | 0–4 |

DETAILED DISCUSSION

In contrast with the above-described state-of-the-art lenses, those of the composition ranges of this invention are distinguished in that they have optimal devitrification stability for such an extreme optical position and for the lowest possible composition costs.

The essential characteristics of this invention primarily reside in the weighed and carefully balanced quantities of the various components in the system $B_2O_3$—$SiO_2$—$La_2O_3$—$ZrO_2$—$Nb_2O_5$ and/or $Ta_2O_5$. The percentage of $B_2O_3 + SiO_2$ is 19 to 27 wt. %, the presence of from 0.5 to 6 wt. % of $SiO_2$ being important for improved devitrification stability and improved viscosity in the casting process. According to the invention, the percentage of $B_2O_3$ is 17 to 24 wt. %. If the $B_2O_3$ component falls below this percentage content, no glasses which are stable in respect of devitrification can be produced; if it rises above 24 wt. %, the required high refractive indices cannot be achieved.

Equally important is the presence of $La_2O_3$ in a minimum amount of 40.1 wt. %. $La_2O_3$ increases the refractive index and provides a high Abbe number. $ZrO_2$, at a content of 5–9 wt. % serves the same purpose. Additions of $ZrO_2$ in percentages higher than 9 wt. % have a deleterious effect on devitrification stability.

The amount of the pentavalent substitute vitrifiers $Ta_2O_5$ and $Nb_2O_5$ in the composition should be in the range of 14 to 27 wt. %. $Nb_2O_5$ may be present in amounts of 0.5 to 25 wt. % while the percentage of $Ta_2O_5$ may be in the range of 0 to 27 wt. %. The pentavalent substitute vitrifiers $Nb_2O_5$ and $Ta_2O_5$, besides fulfilling their vitrification function, ensure a high refractive index, $Ta_2O_5$ at the same time securing a higher Abbe number than $Nb_2O_5$. Thus, a reciprocal exchange of $Nb_2O_5$ and $Ta_2O_5$ offers a facility in predetermining a specific desired Abbe number, taking into account the fact that $Ta_2O_5$ raises the refractive index less strongly than $Nb_2O_5$.

Further, optional components are PbO: 0 to 12 wt. %; $TiO_2$: 0–8 wt. %; $Al_2O_3$: 0–2 wt. %; and ZnO: 0–4 wt.%.

The aforementioned preferred compositions within the general range have optimal refractive indices of 1.86 to 1.94 in relation to Abbe number.

More particularly, in the first mentioned such glass, Abbe numbers of 30–35 are guaranteed. These have been optimally improved in regard to cost effective production inasmuch as they wholly dispense with the expensive component $Ta_2O_5$. For these glasses, a $TiO_2$ component of 1 to 8 wt. % was found extremely favorable; the percentage of $Nb_2O_5$ is 14 to 25 wt. %.

The second mentioned such glasses have Abbe numbers higher than 35 and therefore embody $Ta_2O_5$ in amounts of at least 6 wt. %. The $Ta_2O_5$ and $Nb_2O_5$ percentages are conventionally determined from case to case in relation with required refractive index and Abbe number. Besides this, a higher $La_2O_3$ content of 44 to 51 wt. % is needed. The combined content of $ZrO_2 + La_2O_3$ is 52–58 wt. %. Further, optionally present components are $TiO_2$ in an amount of 0–3 wt. % and ZnO in an amount of 0 to 4 wt. %.

Glasses according to this invention are produced in fully conventional fashion, e.g., by weighing the raw materials (oxides, carbonates, nitrates, etc.) in accordance with the prescribed formulation, adding conventional refining agents such as $As_2O_3$ or $Sb_2O_3$ in conventionally effective amounts, and thoroughly mixing. The glass is then melted down in a platinum crucible at 1300°–1400° C., refined and well homogenized by means of agitators. It is subsequently stirred down to the casting or pouring temperature of 1080°–1200° C., whereupon the glass flux is poured into a ferrous mold.

The glasses of this invention are useful in all optical applications requiring the mentioned optical properties, e.g., in Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following table illustrates some examples of glass compositions according to this invention.

TABLE

|  | 1 | 2 | 3 | 4 | 5 | 6 | 7 | 8 | 9 |
|---|---|---|---|---|---|---|---|---|---|
| $SiO_2$ | 3.00 | 0.70 | 3.35 | 2.55 | 2.55 | 2.70 | 3.00 | 2.45 | 3.10 |
| $B_2O_3$ | 20.10 | 23.10 | 19.50 | 17.75 | 17.45 | 20.00 | 21.05 | 21.05 | 23.00 |
| $La_2O_3$ | 49.65 | 49.10 | 48.60 | 45.45 | 45.65 | 40.10 | 45.20 | 42.00 | 46.50 |
| $ZrO_2$ | 7.90 | 7.90 | 7.70 | 7.30 | 7.60 | 7.55 | 7.45 | 5.65 | 7.90 |
| $Nb_2O_5$ | 11.75 | 12.70 | 7.90 | 1.35 | 14.00 | 17.00 | 17.25 | 23.85 | 16.20 |
| $Ta_2O_5$ | 7.60 | 6.50 | 7.40 | 25.60 | 12.75 | — | — | — | — |
| $TiO_2$ | — | — | 2.35 | — | — | 1.65 | 6.05 | 4.90 | 3.30 |
|  |  | ZnO 3.20 |  |  | ZnO 1.0 PbO 9.5 $Al_2O_3$ 0.5 |  |  |  |  |
| nd | 1.8760 | 1.8740 | 1.8760 | 1.8765 | 1.9067 | 1.8974 | 1.9100 | 1.92700 | 1.8780 |
| vd | 38.10 | 37.80 | 37.40 | 39.40 | 35.10 | 32.40 | 32.00 | 30.70 | 34.30 |

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An essentially $ThO_2$— and $Ta_2O_5$—free optical glass of the system $B_2O_3$—$SiO_2$—$La_2O_3$—$ZrO_2$—$Nb_2O_5$ having a refractive index of 1.86–1.94 and an Abbe number greater than or equal to 30, and high devitrification stability consisting of, in % by weight:

| | |
|---|---|
| $B_2O_3$ | 17–24 |
| $SiO_2$ | 0.5–6 |
| $B_2O_3$ + $SiO_2$ | 19–27 |
| $La_2O_3$ | 40.1–51 |
| $ZrO_2$ | 5–9 |
| $Nb_2O_5$ | 0.5–25 |
| $TiO_2$ | 0–8 |
| PbO | 0–12 |
| ZnO | 0–4 |
| $Al_2O_3$ | 0–2 |

2. An essentially $ThO_2$— and $Ta_2O_5$—free optical glass of claim 1 having a refractive index of 1.87–1.93 an Abbe number of 30–35, and high devitrification stability consisting essentially of, in %, by weight:

| | |
|---|---|
| $B_2O_3$ | 17–23 |
| $SiO_2$ | 1.5–4 |
| $B_2O_3$ + $SiO_2$ | 22–27 |
| $La_2O_3$ | 40.5–49 |
| $ZrO_2$ | 5–8 |
| $Nb_2O_5$ | 15–25 |
| $TiO_2$ | 1–7 |
| PbO | 0–12 |
| ZnO | 0–4 |
| $Al_2O_3$ | 0–2 |

3. A glass of claim 2 wherein the amount of $SiO_2$ is 2.45–4.

4. An optical element consisting essentially of a glass of claim 1.

5. An optical element consisting essentially of a glass of claim 2.

6. An optical element consisting essentially of a glass of claim 3.

* * * * *